United States Patent [19]
Pettersson

[11] Patent Number: 5,884,113
[45] Date of Patent: Mar. 16, 1999

[54] DEVICE AND METHOD FOR MINIMIZING VIGNETTING AND STRAY LIGHT IN A PHOTOGRAPHIC APPARATUS

[75] Inventor: Erland Pettersson, Mölnlycke, Sweden

[73] Assignee: Victor Hasselblad AB, Sweden

[21] Appl. No.: 990,327

[22] Filed: Dec. 15, 1997

[51] Int. Cl.$^6$ .............................. G03B 11/04; G03B 13/02
[52] U.S. Cl. .......................... 396/545; 396/373; 396/534
[58] Field of Search ..................................... 396/534, 535, 396/544, 545, 341, 342, 348, 354, 360, 372, 373

[56] References Cited

U.S. PATENT DOCUMENTS 4,786,929  11/1988  Hamada et al. ......................... 396/283

Primary Examiner—Safet Metjahic
Assistant Examiner—J. K. Han
Attorney, Agent, or Firm—Lerner, David, Littenberg, Krumholz & Mentlik

[57] ABSTRACT

A photographic device such as a camera having a camera body with a first side having a lens mounting device and a second side having a mounting device arranged to mount a film cassette or a rear camera body cover. The second side is located opposite to the first side. The rear camera body cover is attachable to the cover mounting device of the camera body and the cover has an inner side facing the camera body and an outer side opposite to the inner side. The film cassette is attachable to the cover mounting device of the camera body when the rear camera body cover is detached from the cover mounting device. The film cassette is arranged to carry a roll of film and to keep a film frame of the film in a flat state facing the camera body. The device further has an interchangeable lens and an extendable lens hood. The cover further has at least one opening arranged in a location corresponding to one corner or side of the film frame. The opening is arranged to permit a camera user to visually determine if the extendable lens hood is visible through the interchangeable lens as viewed from the film frame plane.

5 Claims, 2 Drawing Sheets

DEVICE AND METHOD FOR MINIMIZING VIGNETTING AND STRAY LIGHT IN A PHOTOGRAPHIC APPARATUS

TECHNICAL FIELD

The present invention relates to a device and method for minimizing vignetting and stray light in a photographic apparatus. The photographic apparatus being, for instance, a camera comprising a camera body, a rear camera body cover, a film cassette, an interchangeable lens, and an extendable lens hood.

BACKGROUND OF THE INVENTION

One problem associated with using photographic apparatuses such as cameras is that, on the one hand, the user wants to minimize the amount of excessive light entering the camera through the lens, also called stray light, and on the other hand, the user wants to obtain clear, crisp and sharp pictures by letting a sufficient amount of light entering the camera as described. One way of cutting down the stray light known in the art is by utilizing an extendable lens hood. This hood screens off superfluous light entering the lens from other directions than directly from the intended subject for the picture to be taken. To accommodate for different focal length lenses, the hood is arranged as a bellows, or similar extendable device, having a first end attached to the lens and a second end open towards the subject. The length of the bellows can be changed by sliding the second end of the hood on a saddle. The user has to have some indication as to how far the hood can be slid forward for any given lens, without cutting of the corners or the sides of the picture projected on the film frame by being slid forwards too far. This can be accomplished by supplying an engraved or otherwise marked scale on the saddle, indicating allowable positions for the second end of the hood for any given lens. One drawback with the above lens hood is that the scale will be very complicated because the optimal setting of the lens hood not only varies with what lens is used, but also with what opening is set of the diaphragm of the lens and the actual focusing distance used. A smaller opening permits a further extension of the hood than a larger opening and a close focusing distance also permits a further extension of the hood than a focusing distance closer to infinity, i.e. far away subjects. Thus, to take all possible settings for all possible lenses into account will result in a scale having a large number of markings. Such a scale is practically impossible to produce. As an alternative, every lens could have its own lens hood with a scale pertaining only to that lens and having markings for different openings correlated to different focusing distances. Also this type of solution has drawbacks, the cost for the user being one, because the user would have to purchase several extendable lens hoods, one for each lens.

An alternative is for the user to memorize, through experience, which extension length of the hood works best with which lens. This is probably a big drawback for most users who want to be able to use their camera without complicated, expensive and lengthy initial trial periods.

SUMMARY OF THE INVENTION

The object of the present invention is to provide an arrangement with which it is ensured that the above drawbacks are mitigated by providing a device and method for minimizing vignetting and stray light in a photographic apparatus, which device and method are easy to use but will give superior control over the amount of vignetting and stray light in all circumstances.

Said object is achieved by the arrangement according to the present invention, where a photographic apparatus comprising a camera body comprising a first side having a lens mounting device and a second side having a mounting device arranged to mount a film cassette or a rear camera body cover, the second side being located opposite to the first side, the rear camera body cover being attachable to the cover mounting device of the camera body, the cover having an inner side facing the camera body and an outer side opposite to the inner side, the film cassette being attachable to the cover mounting device of the camera body when the rear camera body cover is detached from the cover mounting device, the film cassette being arranged to carrying a roll of film and keeping a film frame of the film in a flat state facing the camera body, an interchangeable lens, and an extendable lens hood, wherein the cover further comprises at least one opening arranged in a location corresponding to one corner or side of the film frame, where the opening is arranged to permit a camera user to visually determine if the extendable lens hood is visible through said interchangeable lens as viewed from the film frame plane.

BRIEF DESCRIPTION OF THE DRAWINGS

The invention will be described in greater detail in the following with reference to the accompanying drawings, in which.

PREFERRED EMBODIMENT

Figure 1:
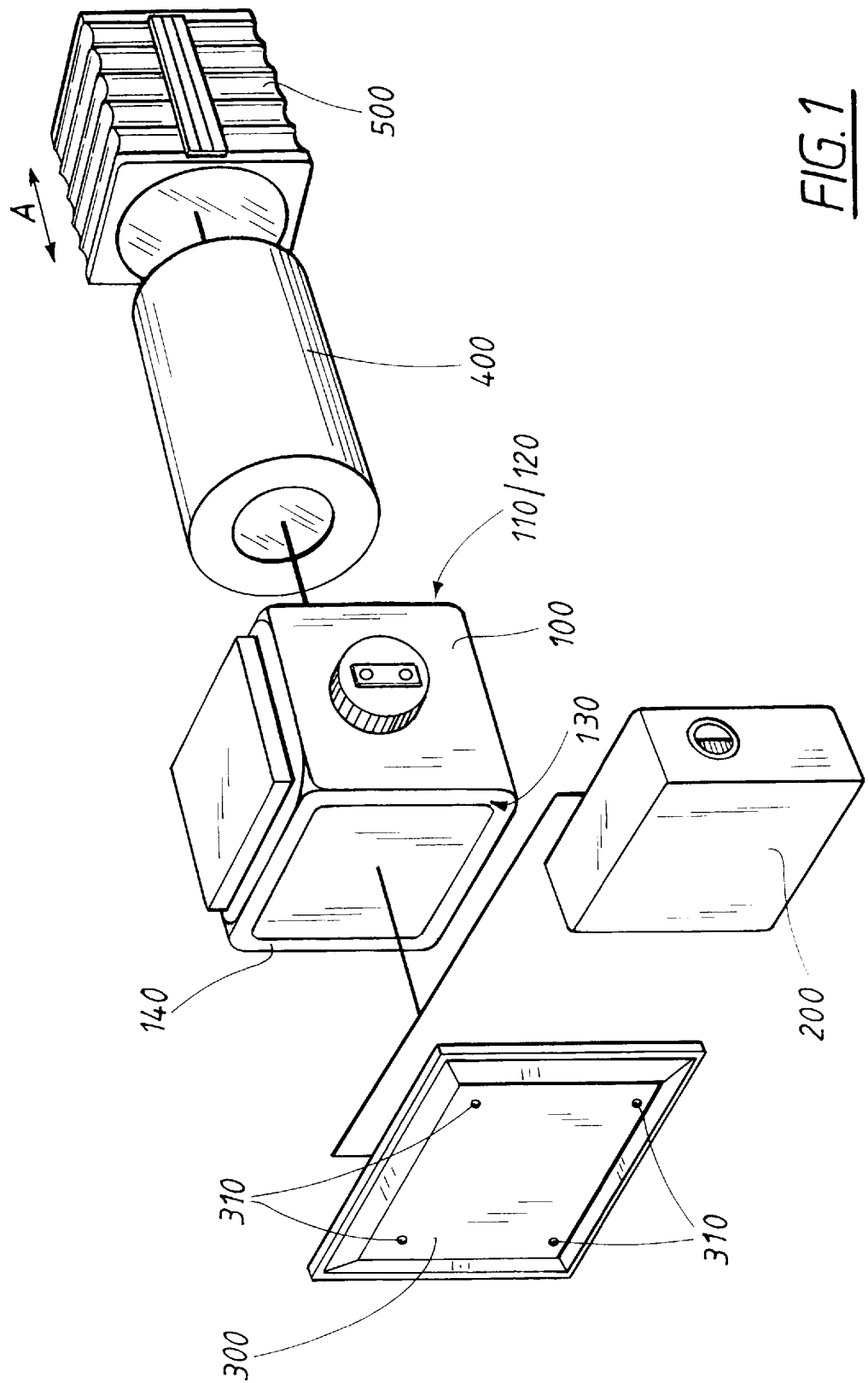
FIG. 1 shows an elevational view of a camera assembly according to the present invention.

FIG. 1 shows a photographic apparatus suitable for use according to the invention, in this example, a camera comprising a camera body 100, a film cassette 200, a rear camera body cover 300, an interchangeable lens 400, and an extendable lens hood 500. The camera could be either a still camera, i.e. for taking still pictures, or a movie camera, i.e. for taking moving pictures or sequences of still pictures.

The camera body has a first side 110 equipped with a lens mount 120 for mounting the lens 400 to the camera body 100 and a second side 130 equipped with a dual purpose mount 140 for mounting either the film cassette 200 or the rear camera body cover 300 to the camera body 100. The film cassette 200 and the rear camera body cover 300 can not be mounted to the camera body 100 both at the same time.

The film cassette 200 is designed to carry a roll of film (not shown) and keep a film frame of the film in a flat state facing the camera body 100. The film cassette 200 may further have film winding means and film counter means (neither is shown in the Fig.).

Figure 2:
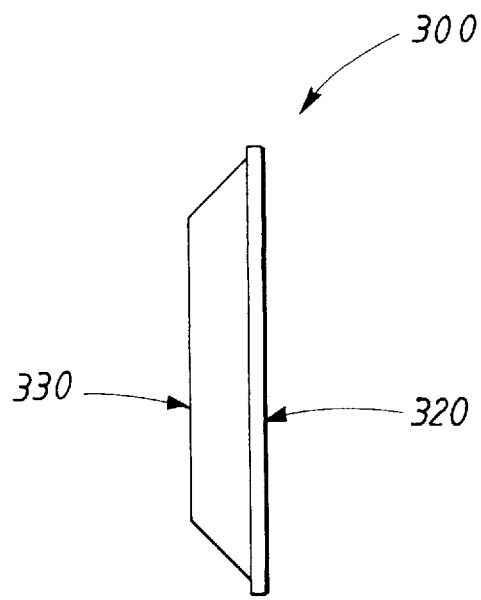
FIG. 2 shows a side view of a rear camera body cover according to the present invention.
Figure 3:
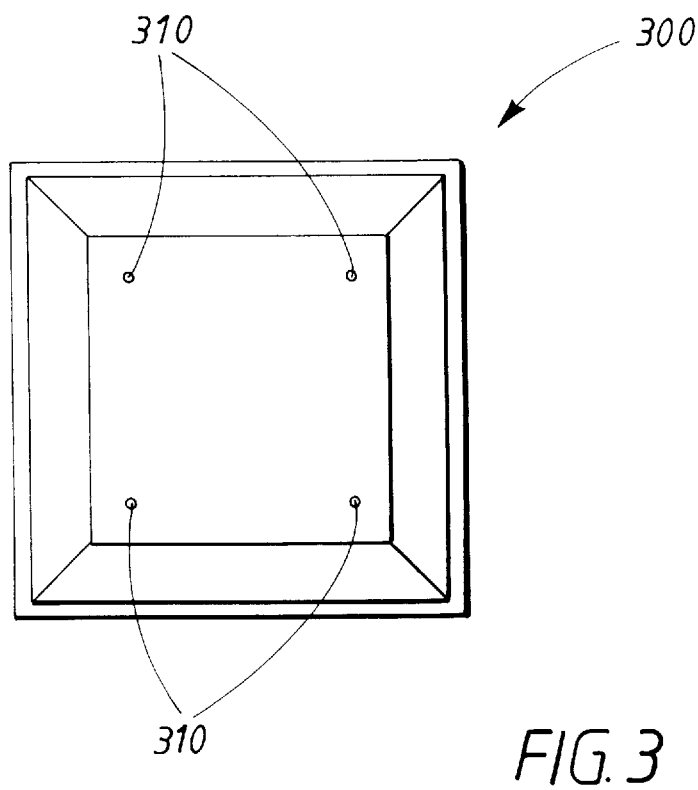
FIG. 3 shows a plan view of the rear camera body cover of to FIG. 2 as viewed from the camera body side.

As is shown in FIGS. 2 and 3, the rear camera body cover 300 has an inner side 320 facing the camera body 100, when the cover is mounted to the camera body, and an outer side 330 opposite to the inner side 320. The rear camera body cover 300 further has at least one opening 310 positioned in a location corresponding to one corner or side of the film frame and connecting the inner side 320 with the outer side 330. The opening 310 is designed to permit a camera user to visually determine if the extendable lens hood 500 is visible through the interchangeable lens 400 as viewed from the film frame plane, i.e. from the second side 130 of the camera body 100.

Thus, a method for using the device described above includes the following steps:

1) mounting the cover 300 on the cover mounting device 140;
2) visually determining if the extendable lens hood 500 is visible through the interchangeable lens 400 as viewed through the at least one opening 310, and
3) if the extendible lens hood 500 is visible through the interchangeable lens 400 as viewed through the at least one opening 310, adjusting the length of the extendable lens hood 500 so that the extendable lens hood is no longer visible through the interchangeable lens as viewed through the at least one opening.

The invention is not limited to the description above nor to the examples shown on the drawings, but may be varied within the scope of the appended claims. For example, the shape of the cross-section of the extendable lens hood is shown as substantially quadratic or square but any suitable shape may be employed for the lens hood, for example substantially round. The openings 310 could be present in a number ranging from one and up to any number practically suitable and be arranged along all sides of the film frame, for example.

I claim:

1. A photographic device comprising:
    a camera body comprising a first side having a lens mounting device and a second side having a cover mounting device arranged to mount a film cassette or a rear camera body cover, said second side being located opposite to said first side;
    said rear camera body cover being attachable to said cover mounting device of said camera body, said cover having an inner side facing said camera body when attached and an outer side opposite to said inner side;
    said film cassette being attachable to said cover mounting device of said camera body when said rear camera body is detached from said cover mounting device, said film cassette being arranged to carrying a roll of film and keeping a film frame of said film in a flat state facing said camera body;
    an interchangeable lens, and
    an extendable lens hood,
    wherein said cover further comprises at least one opening arranged in a location corresponding to one corner or side of said film frame, where said at least one opening is arranged to permit a camera user to visually determine if said extendable lens hood is visible through said interchangeable lens as viewed from the film frame plane.

2. The device according to claim 1, wherein said cover is provided with said at least one opening in locations corresponding to each of the four corners of said film frame.

3. The device according to claim 1, wherein said photographic device is a camera for taking still pictures.

4. The device according to claim 1, wherein said photographic device is a camera for taking moving pictures.

5. Method of minimizing stray light and vignetting in a photographic device, said photographic device comprising
    a camera body comprising a first side having a lens mounting device and a second side having a cover mounting device arranged to mount a film cassette or a rear camera body cover, said second side being located opposite to said first side;
    said rear camera body cover being attachable to said cover mounting device of said camera body, said cover having an inner side facing said camera body when attached and an outer side opposite to said inner side;
    said film cassette being attachable to said cover mounting device of said camera body when said rear camera body cover is detached from said cover mounting device, said film cassette being arranged to carrying a roll of film and keeping a film frame of said film in a flat state facing said camera body;
    an interchangeable lens, and
    an extendable lens hood,
    wherein said cover further comprises at least one opening arranged in a location corresponding to one corner or side of said film frame,
    said method comprising the steps of
        mounting said cover on said cover mounting device;
        visually determining if said extendable lens hood is visible through said interchangeable lens as viewed through said at least one opening, and
        if said extendible lens hood is visible through said interchangeable lens as viewed through said at least one opening, adjusting the length of said extendable lens hood so that said extendable lens hood is no longer visible through said interchangeable lens as viewed through said at least one opening.

* * * * *